July 15, 1969  F. F. DE SMEDT ET AL  3,455,175

ADJUSTMENT MECHANISM

Filed March 14, 1967

INVENTORS
Felix Frederik De Smedt
Victor Alois Marinus

BY
Watson, Cole, Grindle + Watson
ATTORNEYS

3,455,175
ADJUSTMENT MECHANISM
Felix Frederik De Smedt and Victor Alois Marinus, Wilrijk-Antwerp, Belgium, assignors to Gevaert-Agfa N.V., Mortsel, Belgium, a company of Belgium
Filed Mar. 14, 1967, Ser. No. 623,005
Claims priority, application Great Britain, Mar. 14, 1966, 11,137/66
Int. Cl. F16b 1/02
U.S. Cl. 74—89.15                        8 Claims

ABSTRACT OF THE DISCLOSURE

Mechanism for adjusting two relatively moveable parts, such as the lip of a slit extrusion apparatus relative to the apparatus body, wherein the parts are provided with axially aligned threaded bores of equal diameter and pitch, each threadedly engaged by a part of an adjustment screw, the screw parts being threadedly connected together by threads of a different pitch and diameter from the first mentioned threads, each screw part having surfaces thereon engageable by a tool applied in a direction axially of the screw to permit rotation thereof.

---

The present invention relates to an adjustment mechanism, and more particularly to a mechanism especially adapted for the more precise adjustment of the orifice lips of film extrusion apparatus.

The employment of adjustment mechanism is indispensable to numerous mechanical processes and apparatus. Important applications of precision adjustment devices may be found in the adjustment of slot widths of flat film extrusion dies, and in the adjustment of the distance between nips of doctor rollers used in such applications as the coating of webs.

The existing adjustment mechanisms suffer from several disadvantages. They are relatively complicated since they generally comprise threaded shafts carrying threaded skirts, and means for occasionally locking the said shafts. The complicated character of these mechanisms prevents a close spacing of them, and mostly also the proper location of heaters in the case of an extrusion die.

The object of the invention is to provide an improved adjustment mechanism of simple and cheap construction.

A more specific object is to provide an adjustment mechanism of simple construction for use in flat film extrusion dies, the adjustment screws of which mechanism may be closely spaced from each other, and may even be located closely to the lateral extremities of the extrusion die.

According to the present invention, an adjustment mechanism for relatively displacing two parts comprises a screw-threaded bore in one part, an axially aligned bore of equal pitch in the other part, an adjustment screw comprising two parts which are externally threaded and which are each in threaded engagement with one of said screw-threaded bores, said one part of said adjustment screw being provided with a screw-threaded shaft portion of reduced diameter which threadedly engages a threaded bore in the said other part of the adjustment screw, the pitch of the external threads of both parts of said adjustment screw being different from the threads through which said both parts are engaged, and each of said two parts being arranged for receiving a tool to rotate said part.

The mentioned two parts may be different members fixed to an anchorage or anchorages so that they can be relatively displaced by relative movement of said screw parts, or the said two parts may be parts of a common member.

As the invention is particularly intended for use in flat film extrusion apparatus, reference is particularly made to such apparatus in this specification but it is to be understood that the invention may be applied to any situation where a simple adjustment mechanism capable of performing a pulling and pushing movement is deemed necessary.

By the term "lip member" used hereinafter in connection with extrusion dies is not only meant lips which are constituted by square or rectangular bars located against the elongate outlet opening of the manifold of a die, but also lips which are formed by the extremities of the walls defining the manifold, at least one of said walls having a longitudinal region of locally weakened cross-section so as to permit a limited displacement of its extremity in respect of the extremity of the other wall.

The invention will hereinafter be described by way of example in connection with the accompanying drawings in which.

Figure 1:
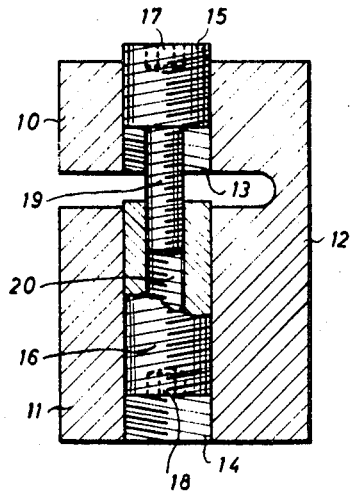
FIG. 1 is a sectional view of an adjustment mechanism according to the invention.

In FIG. 1 a sectional side view of an adjustment mechanism is shown. The mechanism is intended for relatively displacing two parts 10 and 11 of a common member 12. Both parts are provided with the screw-threaded bores 13 respectively 14, of equal diameter and pitch. The adjustment screw comprises two parts 15 and 16 which are in threaded engagement with the bores 13 and 14. Both parts are provided with a hexagon socket 17 respectively 18. The part 15 has an axially projecting shaft 19 of reduced diameter which is in threaded engagement with a threaded bore 20 in the part 16. The pitch of the external threads of the parts 15 and 16 differs from that of the threaded shaft 19.

The adjustment screw is engaged in the mechanism, in holding the screw above the member 12, and in introducing with the hand the part 16 in the bore 13. A hexagon tool is then introduced in the socket 18 through the opening 14 and the part 16 is further screwed downwardly, thereby passing smoothly from the bore 13 into the bore 14, until the lower extremity of the part 15 reaches the bore 13. A second hexagon tool is then introduced in the socket 17 and the part 15 is relatively turned to the part 16 so as to ensure the proper threaded engagement of the part 15 with the bore 13 when both parts are further advanced at equal rotations. The parts finally take a position as shown in the figure. In order to relatively displace the parts 10 and 11, two possibilities exist viz. either the screw part 15 or the screw part 16 is rotated, or both parts are rotated at different speed. In both cases, there is a relative movement between both parts 15 and 16 of the adjustment screw so that, as a consequence of the difference in pitch between the external threads of the screw parts and of the shaft 19, the adjustment screw will tend to relatively approach or remove the parts 10 and 11 of the common member 12.

It is without more ado clear that the described mechanism is extremely simple of construction. The parts 15 and 16 of the adjustment screw may be easily manufactured on automatic machines. The bores 13 and 14 in the member 12 are threaded in one same operation.

The assembling of the described adjustment mechanism is extremely simple in comparison with a number of known like mechanisms wherein one of the stationary parts which is threadedly engaged by the adjustment screw, must be fitted removably in order to permit the proper installing of the adjustment screw.

An unexpected feature of the described mechanism is that in operation, when the screws are tensioned, the rotation of one part of the adjustment screw does not involve a rotation of the second part of the adjustment screw, in spite of the non fixed arrangement of said second part.

An important feature of the new mechanism is its small size so that a plurality of like mechanisms can be closely ranged to each other. This feature is demonstrated by the following embodiment.

Figure 2:
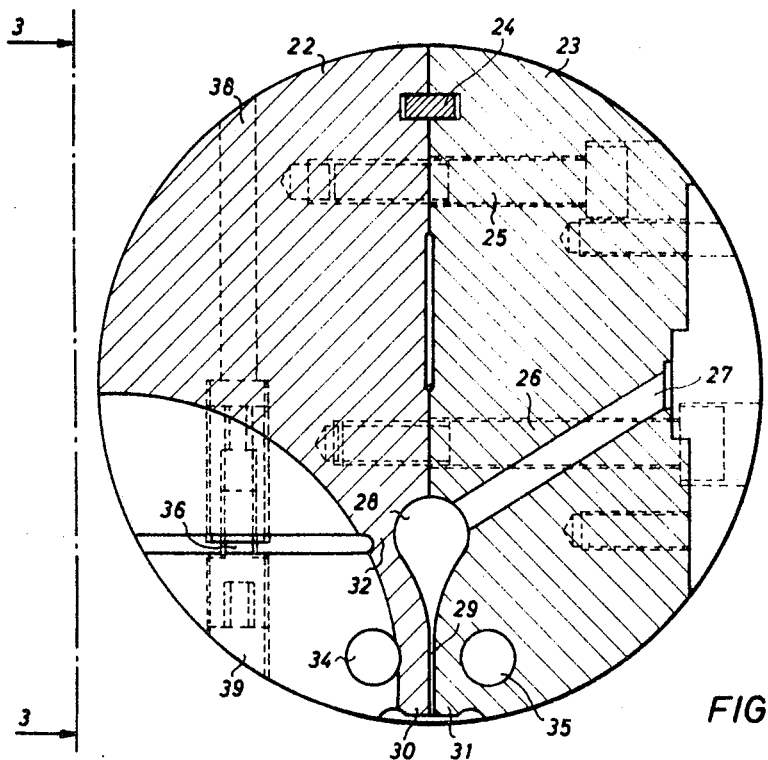
FIG. 2 is a vertical sectional view on line 2—2 of FIG. 3 of an extrusion die which is provided with the adjustment mechanism according to the invention.
Figure 3:
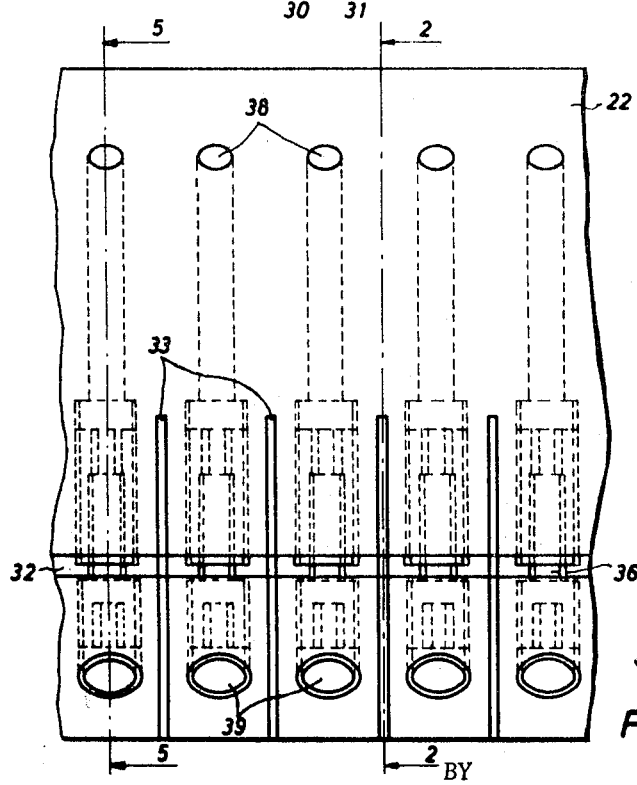
FIG. 3 is an elevational plan view on line 3—3 of FIG. 2 of the die.

In FIG. 2 a vertical sectional view of an extrusion die which is provided with the adjustment mechanism according to the invention is shown. The die is composed of the parts 22 and 23. Both parts are secured in exact mutual relationship by means of the bar 24 and are fitted together by means of two rows of bolts 25 and 26. The extrusion composition is fed through a channel 27 to the teardrop manifold 28. The extrusion orifice 29 which communicates with the manifold is formed by the lip members 30, 31. The lip members constitute the extremities of the parts 22, 23. The lip member 30 is made adjustable by the longitudinal region of locally weakened cross-section 32 and the transverse regions of weakened cross-section 33 (FIG. 3). Channels 34, 35 are provided in which electrical cartridge heaters are inserted for controlling the temperature of the die.

The adjustment of the lip member 30 is controlled by a plurality of adjustment screws 36, which are similar to the screw described hereinbefore. The upper part of the screws 36 is in threaded engagement with the body portion of the part 22, the lower part of the screws is in threaded engagement with the portion of the part 22 below the region of weakened cross-section 32, which controls the displacement of the lip member 30.

In order to rotate the screws for the adjustment of the orifice width, a hexagon key is inserted through a bore 38 into the hexagon socket of the upper part of an adjustment screw, and a second hexagon key is inserted through a bore 39 into the socket of the lower part of the adjustment screw. Alternatively, only one key may be used as described hereinbefore.

According to the direction of relative rotation of the screw parts the width of the extrusion orifice 29 is locally increased or reduced. The adjustment effect extends substantially over the portion of the lip member comprised between the two portions of reduced section 33 at either side of the adjustment screw, but it is clear that this effect is not discontinuous and extends over some further distance.

In the present extrusion apparatus the diameter of the adjustment screws amounted to 14 mm., the distance between the axis of the adjustment screws amounted to 20 mm., and the difference in pitch between the external threads and the internal threads was 0.25 mm. so that a sensitivity of adjustment up to a few microns was obtained.

Figure 4:
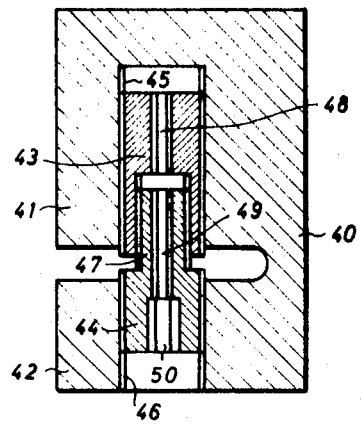
FIG. 4 is a sectional view of a modified adjustment mechanism.

An adjustment mechanism having the particular feature that it may be handled from one side only, is shown in FIG. 4.

Similarly to FIG. 1, it comprises a common member 40 with two relatively displaceable parts 41 and 42 which are controlled by an adjustment screw comprising the parts 43 and 44. The screw part 43 threadedly engages the screw-threaded bore 45, the screw part 44 threadedly engages the threaded bore 46. By means of the shaft portion 47 the part 44 threadedly engages the part 43. The pitch of the inner threading differs from the outer threading.

The screw part 43 is provided with an axial hexagon opening 48. The screw part 44 has an identical opening 49 which runs near the end of the screw part into a hexagon socket of greater size 50.

For introducing both screw parts 43 and 44 in the member 40 they are slid in the relative position as shown over an elongate hexagon key which fits in the openings 49 and 48. The screw part 43 is screwed into the opening 46, and is then passed further through the gap between the parts 42, 41 smoothly into the opening 45. When the screw part 44 starts threadedly engaging the opening 46, the hexagon key is withdrawn from the opening 48, and the screw part 44 is rotated in respect of the part 43 over a few angular degrees until the said part 44 smoothly engages the threaded bore 46 while the key is again slid into the opening 48 so as to advance both screw parts 43 and 44 together.

In order to facilitate the angular setting of both screw parts for inserting them into the member 40, the opening 48 of part 43 may preferably be shaped dodecagonally. When the screw parts 43, 44 have taken a position as shown in the figure, the hexagon key is withdrawn and replaced by a greater one which fits into the hexagon opening 50 of the part 44.

Alternatively, both screw parts may further be advanced, so as to lock the screw part 43 against the bottom of the bore 45.

In rotating the screw part 44 by means of the second key, the parts 41 and 42 of the common member 40 are relatively removed or approached according to the differential working of the adjustment screw.

When in manufacturing the adjustment mechanism according to the invention the necessary precautions are taken and markings are provided for setting the screw parts into a determined angular position, the insertion of both screw parts in the bores 45 and 46 may occur in one operation.

Figure 5:
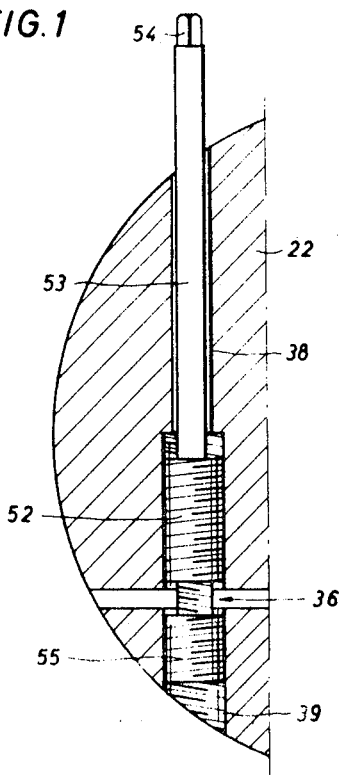
FIG. 5 is a partial vertical sectional view on line 5—5 of FIG. 3 of an extrusion die which is provided with a modified adjustment mechanism.

In FIG. 5 a partial vertical sectional view on line 5—5 of FIG. 3 of an extrusion die is shown provided with adjustment screws which are slightly modified in comparison with those of FIG. 2.

The upper part 52 of the adjustment screws 36 is provided with a shaft 53 instead of a hexagon socket. The shaft 53 extends freely through the bore 38 and has a square head 54 at its extremity. The lower part 55 of the adjustment screw is similar to that of the screws shown in FIGS. 1 and 2.

The adjustment screw is engaged in the die, in inserting the shaft 53 through the bores 38 and 39. The square head 54 then just protrudes out of the bore 38 so that it may be gripped by a key for further rotating it. At the same moment a hexagon key is inserted in the hexagon socket of the lower part 55 of the screw, so that said part may be rotated together with part 52 in order to ensure the proper engagement of the screw.

The adjustment of the orifice of the die is done in rotating the upper parts of the screws by means of a key fitting to the square heads 54.

While reference has been made herein particularly to mechanisms wherein the screw parts serve relatively to displace parts of a common member, it is also possible to provide the screw-threaded bores for said screw parts in two different members which are secured to a fixture or fixtures so that relative rotation of said screw parts serves to vary the spacing between the said members e.g. due to elastic deformation of one or each of the members and/or of the said fixture(s).

We claim:

1. An adjustment mechanism for relatively displacing two parts, comprising a screw-threaded bore in one part, an axially aligned screw-threaded bore of equal internal diameter and thread pitch in the other part, an adjustment screw comprising two parts which are externally threaded and of a diameter substantially equal to the diameter of said bores, each being in threaded engagement with one of said screw-threaded bores, said one part of said adjustment screw being provided with a screw-threaded shaft portion of reduced diameter which threadedly engages a threaded bore in the said other part of the adjustment screw, the pitch of the external threads of both parts of said adjustment screw being different from the threads through which both parts are engaged, and tool-engaging surfaces provided on each of said parts to permit said parts to be rotated, said surfaces being accessible in a direction axially of said adjustment screw.

2. An adjustment mechanism according to claim 1, wherein the said tool-engaging surfaces are in the form of a polygonal opening.

3. An adjustment mechanism according to claim 2, wherein the said polygonal opening extends axially through at least one part of the adjustment screw and communicates with an opening in the other part.

4. An adjustment mechanism according to claim 3, wherein said latter opening is likewise of polygonal shape, said openings being arranged for receiving a common tool.

5. An adjustment mechanism according to claim 3, wherein said polygonal opening which extends axially through at least one part of the adjustment screw runs near the end opposite to the other part of the screw into a polygonal opening of greater size.

6. An adjustment mechanism according to claim 1, wherein the arrangement in a part of the screw for receiving a tool has the form of a hexagonal opening:

7. An adjustment mechanism according to claim 1, wherein a plurality of said screws are arranged in side by side positions.

8. An adjustment mechanism in an elongated slot-type die for extruding a sheet of thermoplastic material, said die having a pair of spaced orifice defining lip members, at least one of said lip members being adjustably arranged for limited displacement relative to the other lip member, the adjustment mechanism controlling said displacement comprising a plurality of closely spaced adjustment screws that extend longitudinally of the die and that may both push and pull the adjustable lip member, each such adjustment screw comprising two parts of equal thread diameter and pitch in threaded engagement respectively with aligned bores in the adjustable lip member and in the body portion of the die, said two parts of each adjustment screw being in threaded engagement with each other through a screw-threaded shaft portion of reduced diameter projecting from one part which engages a threaded bore into the other part, the pitch of the external threads of said parts being different from the threads through which both parts are engaged, each part of each adjustment screw being provided with tool-engaging surfaces to permit said part to be rotated, said surfaces being accessible from a direction axially of the adjustment screw.

References Cited

UNITED STATES PATENTS 3,039,143    6/1962    Nicholson.

FREDERICK L. MATTESON, Jr., Primary Examiner

EDWARD G. FAVORS, Assistant Examiner

U.S. Cl. X.R.

18—12